(12) United States Patent
Woo et al.

(10) Patent No.: US 7,158,768 B2
(45) Date of Patent: Jan. 2, 2007

(54) SWITCHING FILTER MODULE FOR DYNAMIC MULTI-CHANNEL SELECTION

(75) Inventors: Sang-Hyun Woo, Seoul (KR); Dong-Jun Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 380 days.

(21) Appl. No.: 10/863,992

(22) Filed: Jun. 9, 2004

(65) Prior Publication Data
US 2004/0266379 A1 Dec. 30, 2004

(30) Foreign Application Priority Data
Jun. 26, 2003 (KR) .................. 10-2003-0042039

(51) Int. Cl.
*H04B 1/16* (2006.01)
(52) U.S. Cl. .................... 455/179.1; 455/307
(58) Field of Classification Search ............ 455/179.1, 455/187.1, 307, 334, 339, 188.1
See application file for complete search history.

(56) References Cited

U.S. PATENT DOCUMENTS

| | | | | |
|---|---|---|---|---|
| 4,212,013 A | * | 7/1980 | Biethan et al. ............. 370/295 |
| 4,385,402 A | * | 5/1983 | Barrs .......................... 455/339 |
| 5,493,717 A | * | 2/1996 | Schwarz ...................... 455/306 |
| 5,758,296 A | * | 5/1998 | Nakamura ................ 455/575.7 |
| 6,510,313 B1 | * | 1/2003 | Rapeli .......................... 455/323 |
| 6,567,653 B1 | | 5/2003 | Sanders |
| 6,584,304 B1 | * | 6/2003 | Norholm et al. .......... 455/188.1 |
| 7,006,805 B1 | * | 2/2006 | Sorrells et al. ........... 455/188.1 |
| 7,027,777 B1 | * | 4/2006 | Uriu et al. ..................... 455/78 |
| 2004/0266378 A1 | * | 12/2004 | Fukamachi et al. ....... 455/188.1 |

FOREIGN PATENT DOCUMENTS

EP 1 006 669 6/2000

\* cited by examiner

*Primary Examiner*—Nguyen T. Vo
*Assistant Examiner*—Blane J. Jackson
(74) *Attorney, Agent, or Firm*—The Farrell Law Firm

(57) ABSTRACT

A switching filter module for dynamic selection of N channels is provided. In the switching filter module, each of N double-channel selection filters passes the frequency bandwidths of two of successive first to Nth channels having predetermined frequency bandwidths, and one or more 2-way and 3-way switches connect the double-channel selection filters to one another. Each of the N double-channel selection filters is serially connected to at least one of the other double-channel selection filters and at least one 3-way switch.

12 Claims, 12 Drawing Sheets

| NUMBER OF CHANNEL SELECTION | 2 |
|---|---|
| BANDWIDTH OF DATA CHANNEL | 33.2MHz |
| BANDWIDTH OF FILTER | 20MHz * 2 |
| MAX. DATA RATE | 108Mbps |

| NUMBER OF CHANNEL SELECTION | 2 |
|---|---|
| BANDWIDTH OF DATA CHANNEL | 36.6MHz |
| BANDWIDTH OF FILTER | 40MHz |
| MAX. DATA RATE | 120Mbps |

1.2 channels selection

Frequency 1,3 channels selection 1,4 channels selection

Frequency 2,4 channels selection

Frequency

Frequency

| | 1 | 2 | 3 | 4 | 5 | 6 | 7 | 8 |
|---|---|---|---|---|---|---|---|---|
| ONE CHANNEL | 1,2 | 2,3 | 3,4 | 5,6 | 6,7 | 7,8 | | |
| TWO SUCCESSIVE CHANNELS | 1,3 | 1,4 | 1,5 | 1,6 | 1,7 | 1,8 | 2,4 | 2,5 |
| TWO SEPARATE CHANNELS | 2,6 | 2,7 | 2,8 | 3,5 | 3,6 | 3,7 | 3,8 | 4,5 |
| | 4,6 | 4,7 | 4,8 | 5,7 | 5,8 | 6,8 | | |
| TWO SUCCESSIVE AND ONE SEPARATE CHANNELS | 1,2,4 | 1,2,5 | 1,2,6 | 1,2,7 | 1,2,8 | 2,3,5 | 2,3,6 | 2,3,8 |
| | 3,4,5 | 3,4,6 | 3,4,7 | 3,4,8 | 1,5,6 | 2,5,6 | 3,5,6 | 4,5,6 |
| | 1,6,7 | 2,6,7 | 3,6,7 | 4,6,7 | 1,7,8 | 2,7,8 | 3,7,8 | 4,7,8 |
| THREE SEPARATE CHANNELS | 1,3,5 | 1,3,6 | 1,3,7 | 1,3,8 | 1,4,5 | 1,4,6 | 1,4,7 | 1,4,8 |
| | 2,4,5 | 2,4,6 | 2,4,7 | 2,4,8 | 1,5,7 | 2,5,7 | 3,5,7 | 4,5,7 |
| | 1,5,8 | 2,5,8 | 3,5,8 | 4,5,8 | 1,6,8 | 2,6,8 | 3,6,8 | 4,6,8 |
| TWO SUCCESSIVE AND TWO SUCCESSIVE CHANNELS | 1,2,5,6 | 1,2,6,7 | 1,2,7,8 | 2,3,5,6 | 2,3,6,7 | 2,3,7,8 | 3,4,5,6 | 3,4,6,7 |
| | 3,4,7,8 | | | | | | | |

FIG.11

SWITCHING FILTER MODULE FOR DYNAMIC MULTI-CHANNEL SELECTION

PRIORITY

This application claims priority under 35 U.S.C. § 119 to an application entitled "Switching Filter Module for Dynamic Multi-Channel Selection" filed in the Korean Intellectual Property Office on Jun. 26, 2003 and assigned Serial No. 2003-42039, the contents of which are incorporated herein by reference.

BACKGROUND OF THE INVENTION

1. Field of the Invention

The present invention relates generally to a wireless communication system, and in particular, to a switching filter module for selectively receiving wireless communication channels having good reception sensitivity simultaneously among a plurality of wireless communication channels.

2. Description of the Related Art

Unlike cellular communication schemes for providing high-speed mobile service, WLAN (Wireless Local Area Network) have been adapted to satisfy the demand for high-speed data service from users stationed at relatively fixed locations, and has recently boosted its market growth. In accordance with the international WLAN standard commonly accepted so far, IEEE 802.11a/b/g, a bandwidth of approximately 20 MHz is used for each channel. For providing of higher throughput multimedia service, however, there is a need for introducing a system using a wider bandwidth. This wideband WLAN system uses one or more channels based on the current standard in combination, for compatibility with existing WLAN systems.

Implementation of a module that can select a plurality of channels simultaneously requires a plurality of filters, each for selecting a signal frequency corresponding to a channel.

FIG. 1 illustrates the configuration of a conventional switching filter module for simultaneously selecting one or two channels from among four available channels. While the filter module is shown to be applied to a low-band receiver in a WLAN system, it can also be applied to a transmitter.

Referring to FIG. 1, a reception antenna 102 receives an RF (Radio Frequency) signal. A band pass filter (BPF) 104 filters the RF signal and outputs a filtered signal in a relatively wide frequency band. A low noise amplifier (LNA) 106 amplifies the filtered signal. A mixer 108 down-converts the frequency of the amplified signal to an IF (Intermediate Frequency) signal using a local oscillation frequency generated from a local oscillator 110. Since the IF signal contains a plurality of channel signals in predetermined frequency bands, a switching filter module 112 selects desired channel signals for use and feeds the selected signals to a demodulator (not shown).

The switching filter module 112 comprises channel selection filters 116a to 116g for passing one or two desired channel signals, while suppressing the other channel signals contained in the IF signal. For ease of reference, a number (or numbers) is provided on each channel selection filter that represents a channel that the filter passes. An on-off switch (one of 114a to 114g) is provided at the front end of each channel selection filter.

The switching filter module 112 processes the four channel signals having successive adjacent frequency bandwidths. In the case where channels #1 and #4 are selected at the same time, the switching filter module 112 turns on the first and fourth switches 114a and 114d at the front ends of the first and fourth channel selection filters 116a and 116d, while turning off the switches 114b, 114c, 114e, 114f and 114g at the front ends of the other channel selection filters 116b, 116c, 116e, 116f and 116g. If adjacent channels #1 and #2 are to be selected simultaneously, the switching filter module 112 turns on the first and second switches 114a and 114b at the front ends of the first and second channel selection filters 116a and 116b, while turning off the other switches 114c to 114g.

The switching filter module 112 can select two adjacent channels by use of two of four channel selection filters each of which can select only one channel. In this case, however, since the two independent channel selection filters are used in parallel, each of both filters suppresses its adjacent channel signal. For example, when the switching filter module 112 selects two adjacent channels at the same time according to IEEE 802.11a WLAN using an effective bandwidth of 16.6 MHz for each channel, an effective bandwidth of only 33.2 MHz (=16.6×2) is available, as illustrated in FIG. 2A.

On the other hand, if two adjacent channels are selected using the channel selection filters 116e to 116g can select the entire bandwidth of two channels from the start frequency of a lower channel to the end frequency of a higher channel, an effective bandwidth of 36.6 MHz can be obtained, as illustrated in FIG. 2B. A maximum data rate gain of the 802.11a scheme, which can be achieved as the effective bandwidth increases, is up to about 11%.

As described above, the concurrent selection of two adjacent channels by use of two of the four available channel selection filters of which each selects only one channel reduces efficiency of frequency usage. To overcome this problem, the channel selection filters 116e, 116f and 116g are additionally needed to simultaneously select two adjacent channels. Consequently, the switching filter module 112 requires relatively many, i.e., seven channel selection filters to select one or two channels from four channels. Similarly, 15 channel selection filters are needed for selection of 8 channels, and 31 channel selection filters for selection of 12 channels.

In the above conventional switching filter module, (2N−1) channel selection filters are required for N available channels. Therefore, as the number of available channels increases, the number of filters required to achieve desired response characteristics is significantly increased. As a result, the size and cost of the module are increased.

SUMMARY OF THE INVENTION

An object of the present invention is to substantially solve at least the above problems and/or disadvantages and to provide at least the advantages below. Accordingly, an object of the present invention is to provide a switching filter module for dynamically selecting a plurality of channels in a WLAN system.

Another object of the present invention is to provide a switching filter module for dynamically selecting a plurality of channels having adjacent bandwidths by use of a reduced number of filters.

The above objects are achieved by providing a switching filter module for dynamic multi-channel selection.

In accordance with an embodiment of the present invention, in a switching filter module for dynamic multi-channel selection, a 2-way switch switches an input signal containing at least one of first to fourth channels having predetermined frequency bandwidths to one of first and second output points, a first double-channel selection filter has an input port connected to the first output point of the 2-way switch and an output port connected to the second output point of the 2-way switch and passes the frequency bandwidths of the adjacent first and second channels, a first 3-way switch switches the output of the first double-channel selection filter to one of first, second and third output points of the first 3-way switch, and a second double-channel selection filter has an input port connected to the first output point of the first 3-way switch and an output port connected to the second output point of the first 3-way switch, and passes the frequency bandwidths of the adjacent second and third channels. Here, the output port of the second double-channel selection filter is a first output node of the switching filter module. A third double-channel selection filter passes the frequency bandwidths of the adjacent third and fourth channels, and a second 3-way switch switches the output of the third double-channel selection filter to one of first, second and third output points of the second 3-way switch. Here, the first output point of the second 3-way switch is connected to the input port of the second double-channel selection filter. A fourth double-channel selection filter has an input port connected to the second output point of the second 3-way switch and an output port connected to the third output point of the second 3-way switch, and passes the frequency bandwidths of the first and fourth channels. The output port of the fourth double-channel selection filter is a second output node of the switching filter module.

In accordance with another embodiment of the present invention, in a switching filter module for dynamic selection of N channels, each of N double-channel selection filters passes the frequency bandwidths of two of successive first to Nth channels having predetermined frequency bandwidths, and one or more 2-way and 3-way switches connect the double-channel selection filters to one another. Each of the N double-channel selection filters is serially connected to at least one of the other double-channel selection filters and at least one 3-way switch.

BRIEF DESCRIPTION OF THE DRAWINGS

The above and other objects, features and advantages of the present invention will become more apparent from the following detailed description when taken in conjunction with the accompanying drawings in which:

FIG. 11 illustrates a table listing channel combinations selectable by the switching filter module illustrated in FIG. 10.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention is intended to provide a switching filter module that allows concurrent use of a plurality of channels without interference based on information such as the channel states of concurrent users in a WLAN system using a plurality of channels simultaneously according to IEEE 802.11, 802.11a, 802,11b or 802.11g.

Figure 1:
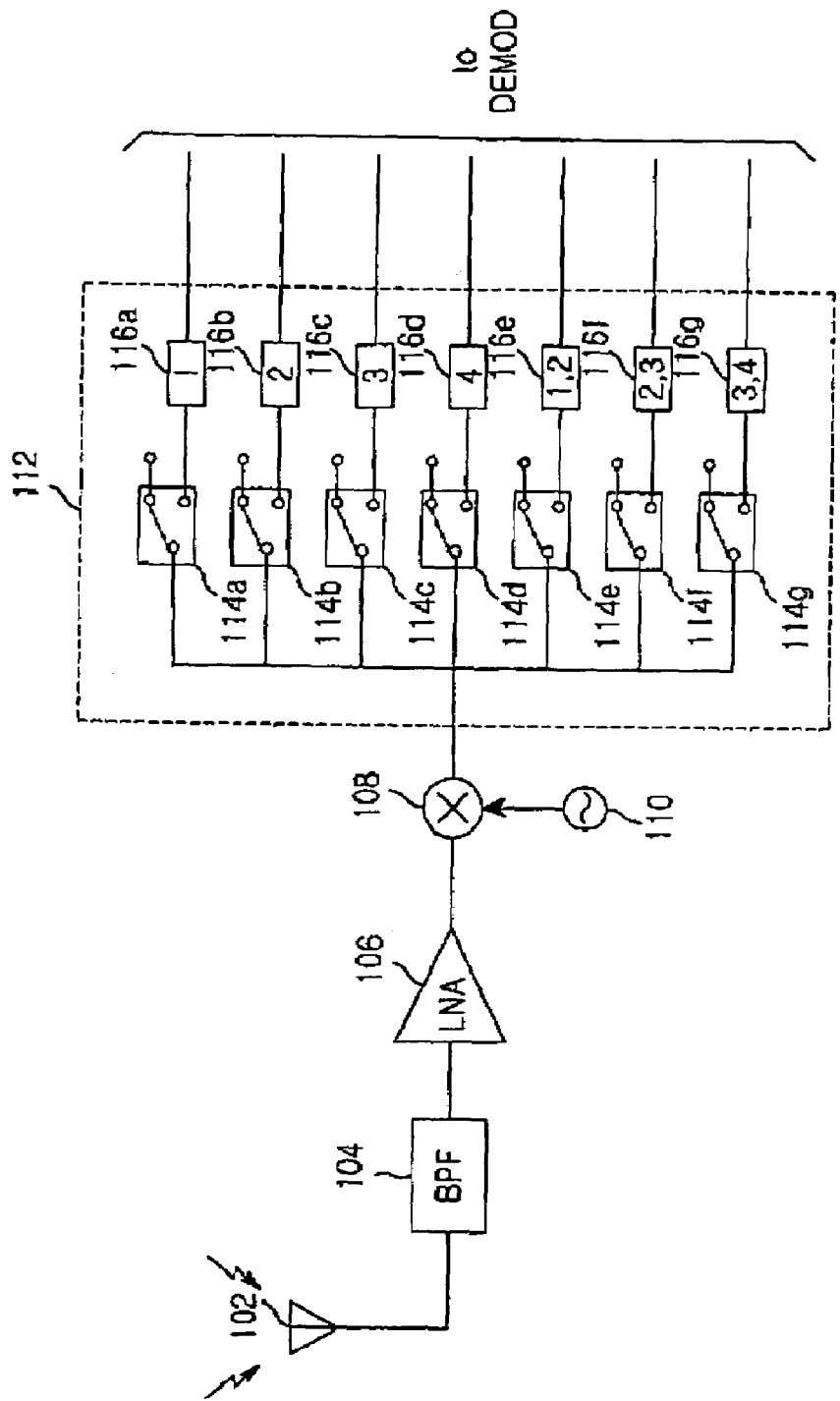
FIG. 1 illustrates the configuration of a conventional filter module for simultaneously selecting one or two channels among available channels.
Figure 2A:
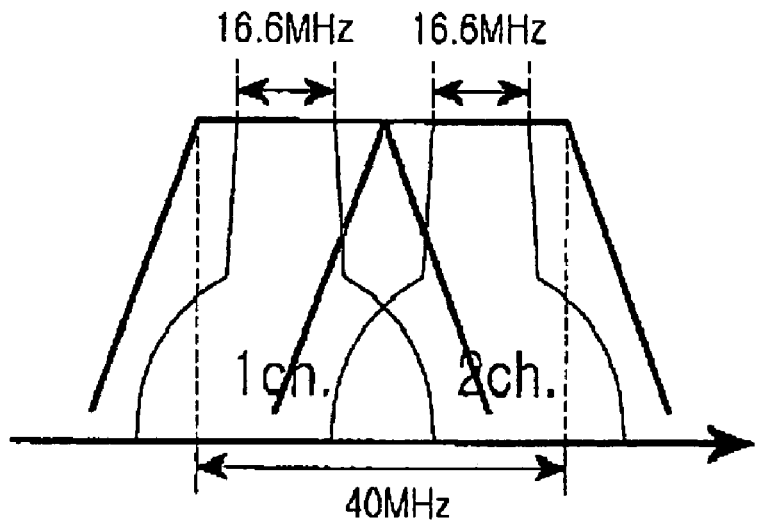
FIGS. 2A and 2B illustrate the effective bandwidths of single-channel and double-frequency selection filters.
Figure 2B:
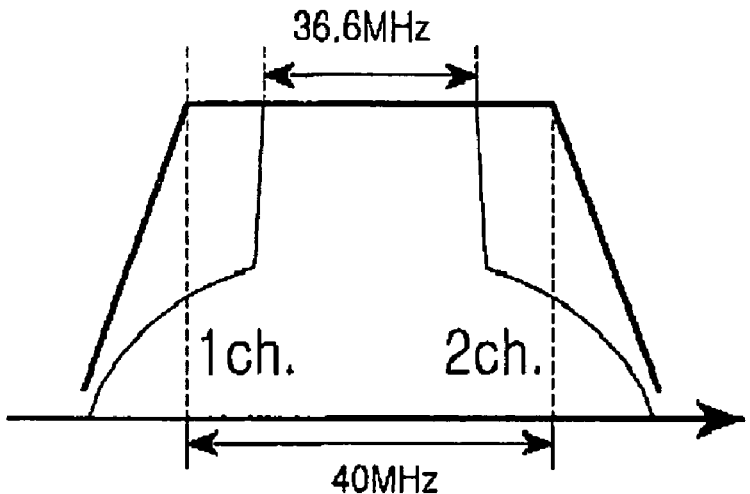
Figure 3:
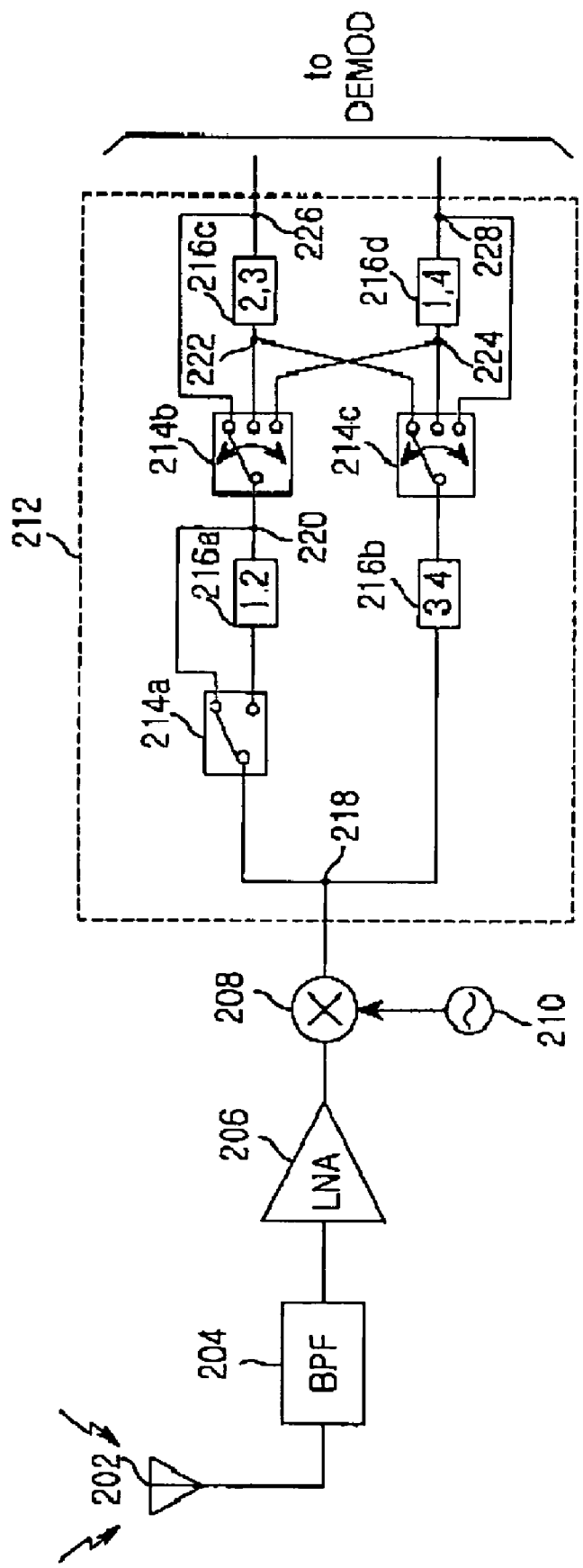
FIG. 3 illustrates the configuration of a switching filter module for dynamically selecting multiple channels according to an embodiment of the present invention.

FIG. 3 illustrates the configuration of a switching filter module for dynamic multi-channel selection according to an embodiment of the present invention. Although the switching filter module is applied between an RF module and a demodulator in a receiver of a WLAN system, it can also be applied to a transmitter. In the transmitter, the switching filter module is disposed between a modulator and an RF module.

Referring to FIG. 3, a reception antenna 202 receives an RF signal. A BPF 204 filters the RF signal and outputs a filtered signal in a relatively wide frequency band. An LNA 206 amplifies the filtered signal. A mixer 208 downconverts the frequency of the amplified signal to an IF signal using a local oscillation frequency generated from a local oscillator 210. Since the IF signal contains a plurality of channel signals in predetermined frequency bands, a switching filter module 212 selects channel signals used among them and feeds the selected signals to a demodulator (not shown).

To process first to fourth channels having successive predetermined frequency bands, the switching filter module 212 comprises one 2-way switch 214a, two 3-way switches 214b and 214c, and four double-channel selection filters 216a to 216d. Numbers labeled in each of the double-channel selection filters 216a to 216d denote the indexes of channels that are passed in the filter. Each of the filters 216a to 216d functions as a frequency selection filter capable of passing double channel bandwidths, and thus pass two channels.

An input signal to the switching filter module 212 is branched at a first node 218 into a first path and a second path. The 2-way switch 214a connects the first-path signal to the input or output (a second node 220) of the double-channel selection filter 216a by determining whether to bypass the signal around the double-channel selection filter 216a. For the input signal, the double-channel selection filter 216a passes only the frequency bands of first and second adjacent channels to the second node 220.

The second node 220 is connected to the 3-way switch 214b. The 3-way switch 214b determines whether to bypass the signal from the second node 220 around the double-channel selection filter 216c to a first output node 226, to provide the signal to the double-channel selection filter 216c via a third node 222, or to the input (via a fourth node 224) of the double-channel selection filter 216d according to the determination result. For the input signal, the double-channel selection filter 216c transmits only second and third adjacent channel signals to the first output node 226.

Meanwhile, the second-path signal branched from the first node 218 is provided to the double-channel selection filter 216b. For the input of the second-path signal, the double-channel selection filter 216b passes only the frequency bands of third and fourth adjacent channels to the 3-way switch 214c. The 3-way switch 214c determines whether to bypass the signal from the double-channel selection filter 216b around the double-channel selection filter 216d (to second output node 228), to provide the signal to the double-channel selection filter 216c (via the third node 222), or to provide the signal to the input (via fourth node 224) of double-channel selection filter 216d according to the determination result. The double-channel selection filter 216d transmits only the first channel signal having the lowest frequency bandwidth and the fourth channel signal having the highest frequency band to the second output node 228.

Figure 4:
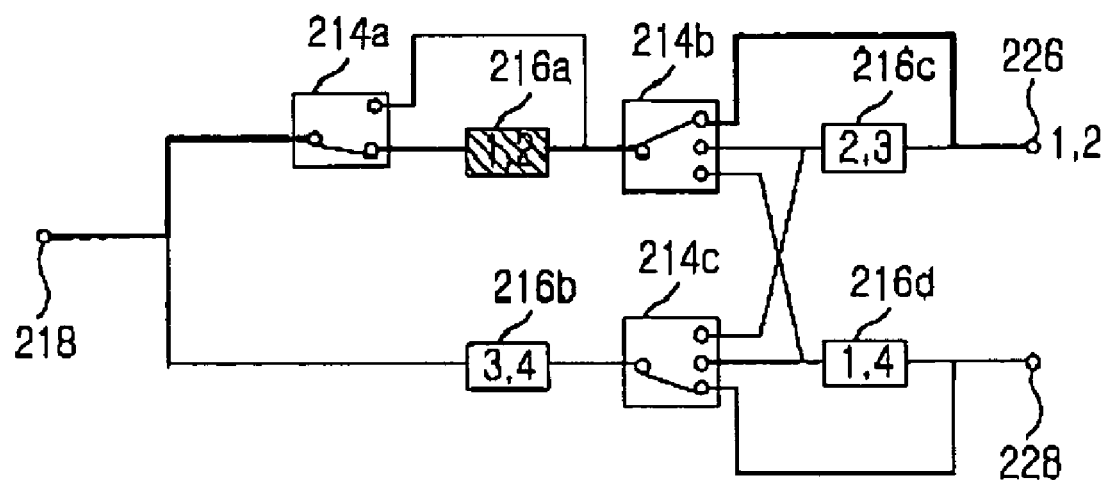
FIGS. 4 to 9 illustrate signal flows in cases of selecting two channels according to the present invention.
Figure 4:
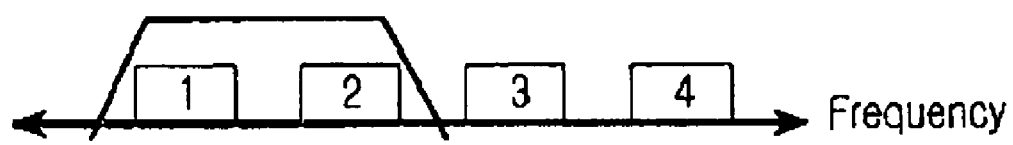
Figure 7:
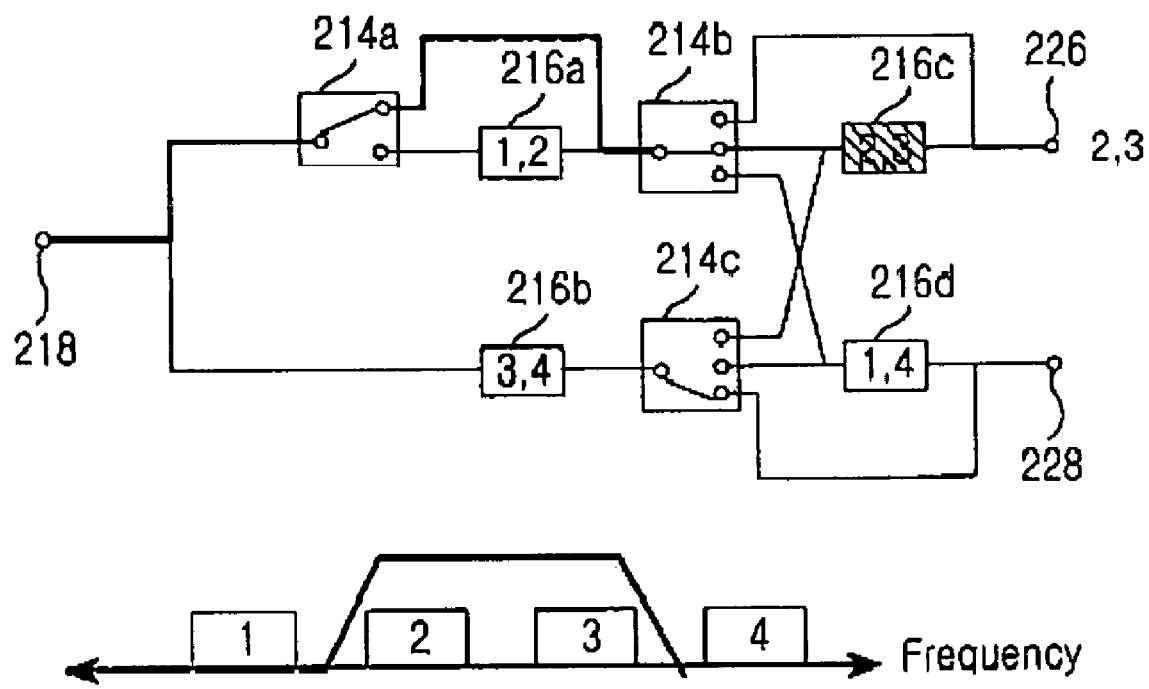
Figure 8:
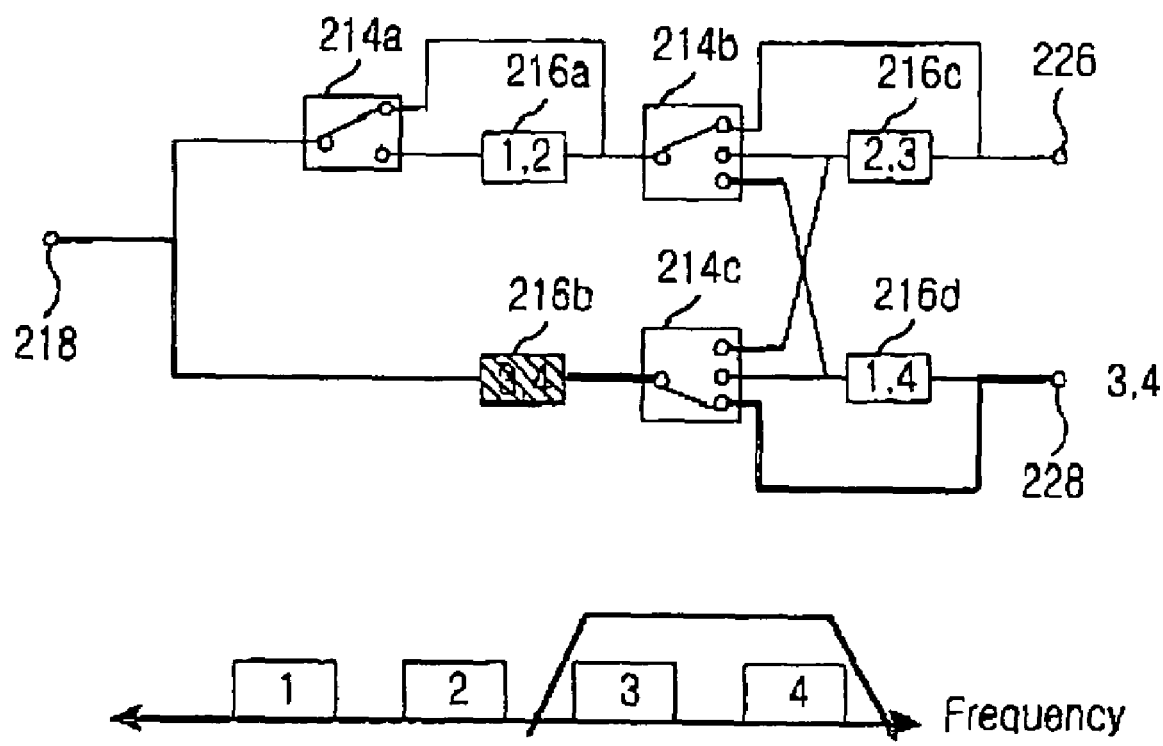

Selection of two desired channels in the switching filter module 212 having the above-described configuration will be described with reference to FIGS. 4 to 9. Especially, FIGS. 4, 7 and 8 illustrate the cases where adjacent channels are selected. In these cases, a wider effective bandwidth of 36.6 MHz is achieved in view of the nature of double-channel selection.

FIG. 4 illustrates a signal flow in the case where the first and second channels are selected. As illustrated in FIG. 4, the 2-way switch 214a comes into contact with its lower output point and the double-channel selection filter 216a passes the first and second channel signals. The 3-way switch 214b comes into contact with its upper output point to thereby connect the signal from the double-channel selection filter 216a to the first output node 226. In the second path, a signal output from the second output node 228 is not used and the 3-way switch 214c comes into contact with its middle or lower output point. Thus, the switching filter module 212 outputs the first and second channel signals.

Figure 5:
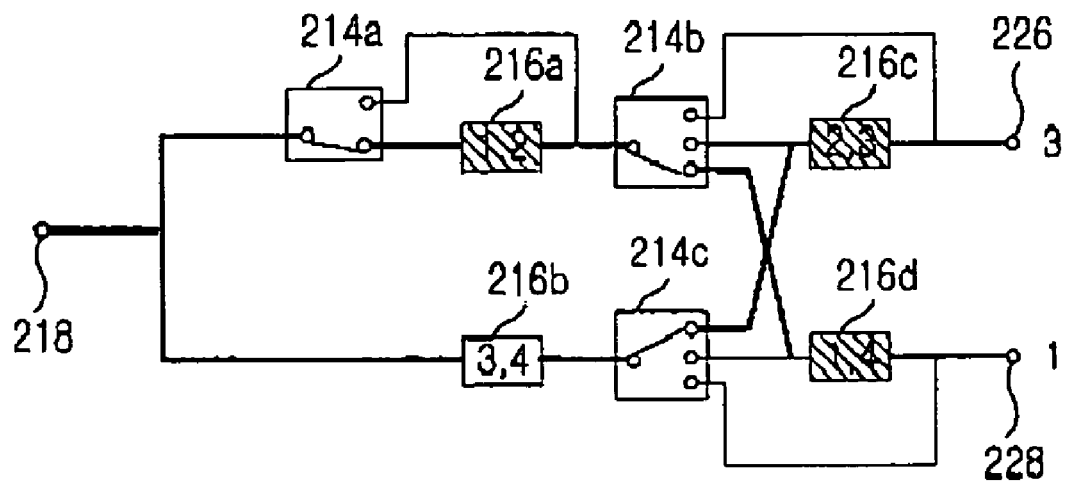
Figure 5:
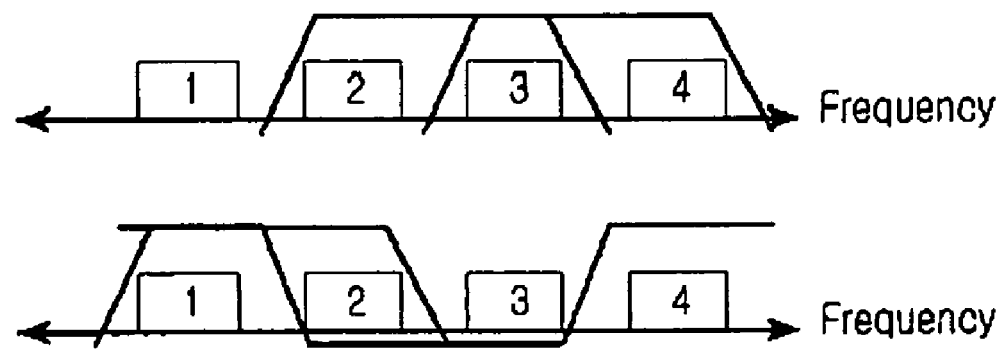

FIG. 5 illustrates a signal flow in the case where the first and third channels are selected. As illustrated in FIG. 5, the 2-way switch 214a comes into contact with its lower output point and the double-channel selection filter 216a passes the first and second channel signals. The 3-way switch 214b comes into contact with its lower output point and the double-channel selection filter 216d passes the first and fourth channel signals. Hence, the first channel signal commonly output from the double-channel selection filters 216a and 216d is provided to the second output node 228. In the second path, the double-channel selection filter 216b passes the third and fourth channel signals. The 3-way switch 214c comes into contact with its upper output point and the double-channel selection filter 216c passes only the third channel signal, with the second channel signal having been blocked by double-channel selection filter 216b. Hence, the third channel signal commonly output from the double-channel selection filters 216b and 216c is provided to the first output node 226. Thus, the switching filter module 212 outputs the third and first channel signals through the first and second output nodes 226 and 228, respectively.

Figure 6:
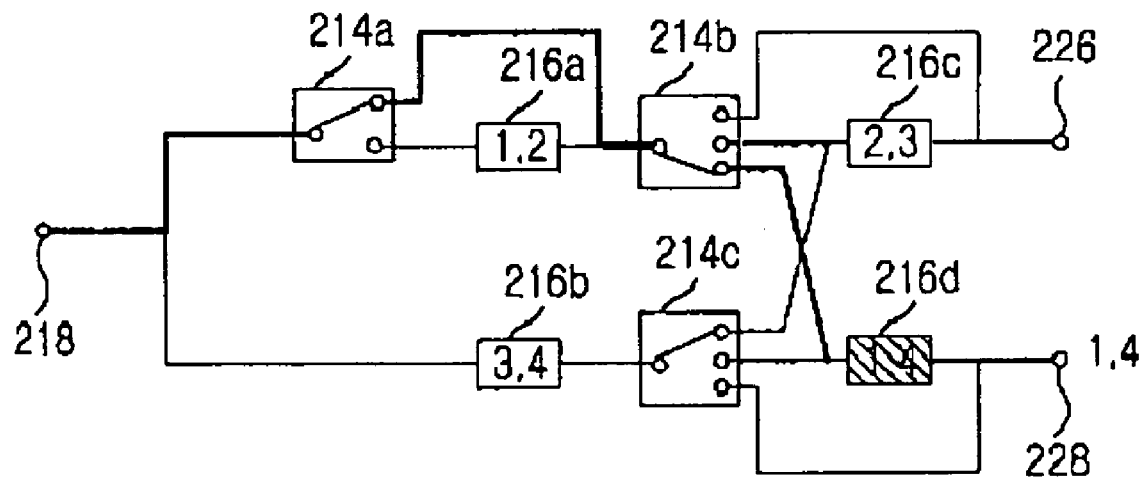
Figure 6:
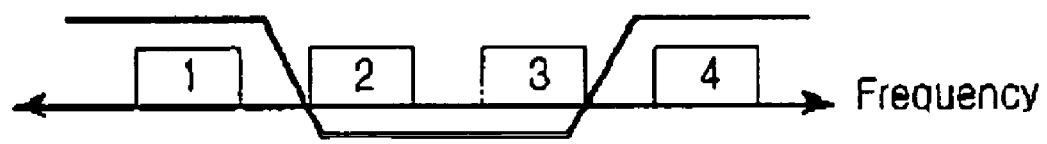

FIG. 6 illustrates a signal flow in the case where the first and fourth channels are selected. As illustrated in FIG. 6, the 2-way switch 214a comes into contact with its upper output point and thus is connected to the 3-way switch 214b. The 3-way switch 214b comes into contact with its lower output point and thus is connected to the double-channel selection filter 216d. The double-channel selection filter 216d passes the first and fourth channel signals to the second output node 228. A signal output from the first output node 226 is not used and the 3-way switch 214c comes into contact with its upper or lower output point. Thus, the switching filter module 212 outputs the first and fourth channel signals through the second output node 228.

FIG. 7 illustrates a signal flow in the case where the second and third channels are selected. As illustrated in FIG. 7, the 2-way switch 214a comes into contact with its upper output point and thus is connected to the 3-way switch 214b. The 3-way switch 214b comes into contact with its middle output point and thus connects the signal from the 2-way switch 214a to the double-channel selection filter 216c. For the input signal, the double-channel selection filter 216c passes the second and third channel signals to the first output node 226. A signal output from the second output node 228 is not used and the 3-way switch 214c comes into contact with its lower output point. Thus, the switching filter module 212 outputs the second and third channel signals through the first output node 226.

FIG. 8 illustrates a signal flow in the case where the third and fourth channels are selected. As illustrated in FIG. 8, the double-channel selection filter 216b passes the bandwidths of the third and fourth channels to the 3-way switch 214c, for the an signal. The 3-way switch 214c comes into contact with its lower output point and thus connects the signal from the double-channel selection filter 216b to the second output node 228. The second output node 228 then outputs the third and fourth channel signals. A signal output from the first output node 226 is not used irrespective of the contact points of the switches 214a and 214b. Thus, the switching filter module 212 outputs the third and fourth channel signals through the second output node 228.

Figure 9:
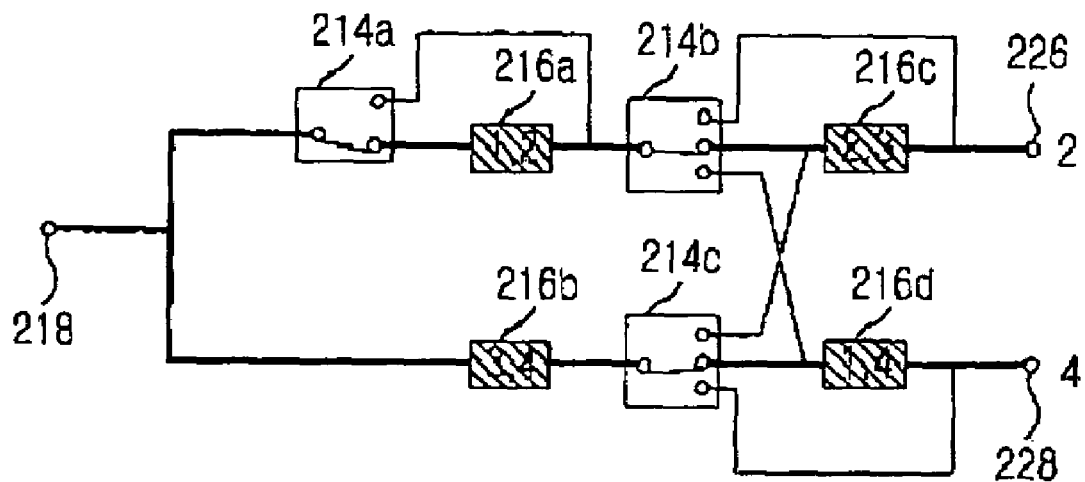
Figure 9:
Figure 9:

FIG. 9 illustrates a signal flow in the case where the second and fourth channels are selected. As illustrated in FIG. 9, the double-channel selection filter 216a passes the bandwidths of the first and second channels to the 3-way switch 214b. The 3-way switch 214b comes into contact with its middle output point and thus connects the signal from the 3-way switch 214b to the double-channel selection filter 216c. The double-channel selection filter 216c passes only the bandwidth of the second channel to the first output node 226, with the first channel signal having been blocked by double-channel selection filter 216a. Hence, the first output node 226 outputs the second channel signal commonly output from the double-channel selection filters 216a and 216c.

In the second path, the double-channel selection filter 216b passes the bandwidths of the third and fourth channels. The 3-way switch 214c comes into contact with its middle output point and the double-channel selection filter 216d passes the bandwidths of the fourth channel, with the third channel signal having been blocked by double-channel selection filter 216b. Hence, the second output node 228 outputs the fourth channel signal commonly output from the double-channel selection filters 216b and 216d. Thus, the switching filter module 212 outputs the second and fourth channel signals through the first and second output nodes 226 and 228, respectively.

While the above-described signal flows are confined to two channel-selection, it will be understood by one of the skill in the art that the switching filter module 212 can select one, two or three channels among the four channels based on the same operation principle. For example, if only one channel is to be selected, a signal from the second output node 228 through the double-channel selection filters 216a and 216d is used, while a signal from the first output node is neglected. As another example, if the first, second and third channels are to be selected, signals from the first output node 226 through the double-channel selection filters 216a and 216c are used, while a signal from the second output node 228 is neglected.

Although the switching filter module 212 illustrated in FIG. 3 is implemented in the basic structure supporting four channels, a switching filter module capable of dynamically selecting as many channels as a multiple of 4 can be implemented using two or more basic structures in combination. According to IEEE 802.11a, 8 channels, each having a bandwidth of 20 MHz are used in a reception frequency band ranging from 5.15 to 5.35 GHz.

Figure 10:
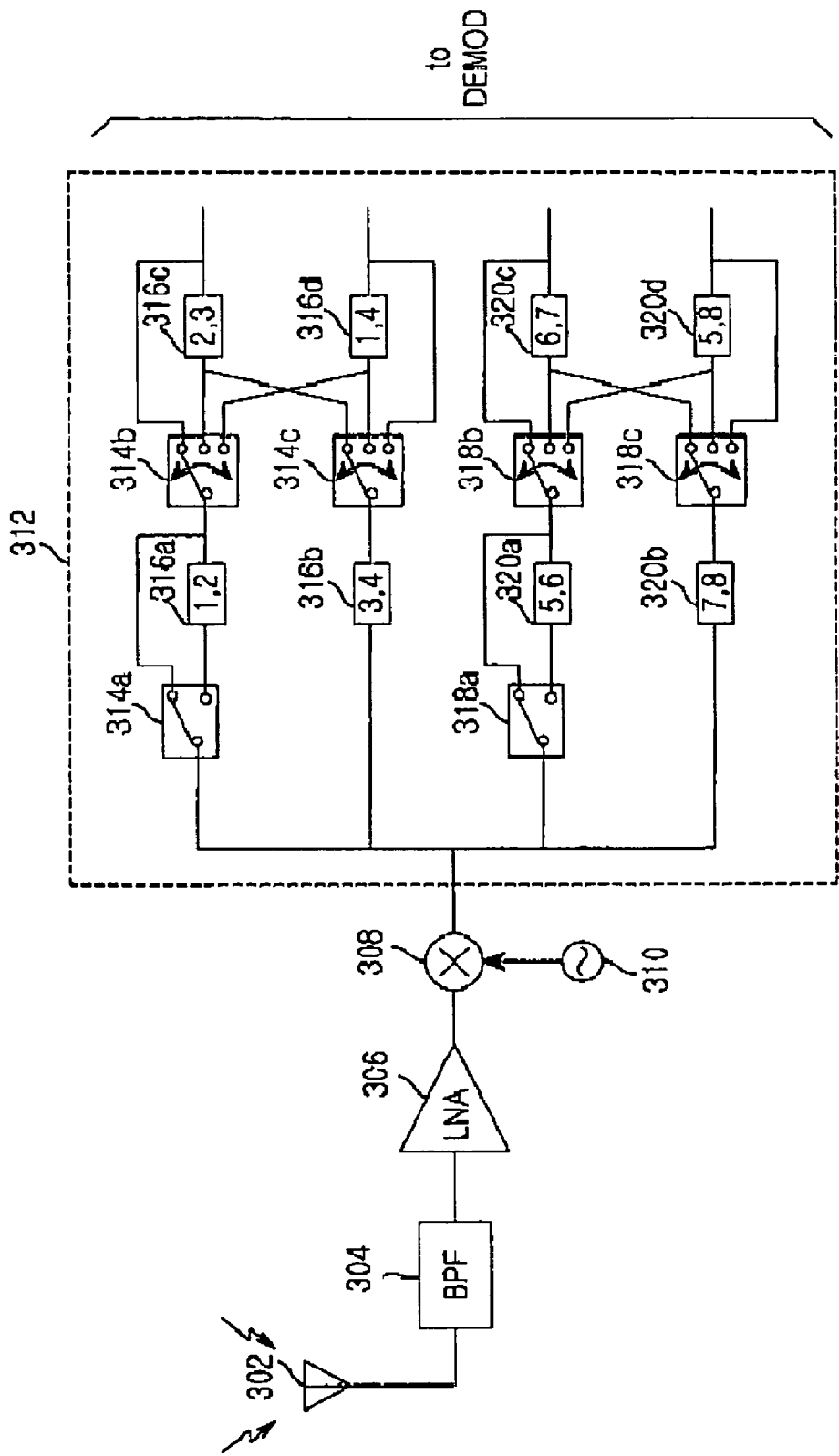
FIG. 10 illustrates the configuration of a receiver including a switching filter module which is configured to have two basic structures for 8 channels according to another embodiment of the present invention.

FIG. 10 illustrates the configuration of a receiver including a switching filter module of two basic structures for 8 channels according to another embodiment of the present invention. Referring to FIG. 10, the receiver comprises a reception antenna 302, a BPF 304, a LNA 306, a mixer 308, a local oscillator 310, and a switching filter module 312.

The switching filter module 312 has switches 314a, 314b and 314c and double-channel selection filters 316a to 316d, for selecting desired channels among first to fourth channels having successive predetermined frequency bandwidths, and switches 318a, 318b and 318c and double-channel selection filters 320a to 320d, for selecting desired channels among fifth to eighth channels having successive predetermined frequency bandwidths.

FIG. 11 tabulates channel combinations available to the switching filter module 312 illustrated in FIG. 10. While only combinations of up to four channels are shown here, five or more channels can be combined using the switches 314a to 314c and 318a to 318c.

As illustrated in FIG. 11, the switching filter module 312 can select two successive channels, two separate channels, two successive and one separate channels, three separate channels, and two successive and two successive channels.

In accordance with the present invention as described above, the number of switches and filters required to select N channels is reduced. Therefore, an RF module size and implementation cost are remarkably reduced and passing desired channels, while suppressing unnecessary frequency components makes it possible to maintain response performance. Furthermore, since alternative adjacent channels are filtered overlappingly using two channel-selection filters, frequency selectivity is increased.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A switching filter module for dynamic multi-channel selection, comprising:
   a 2-way switch for switching an input signal containing at least one of first to fourth channels having predetermined frequency bandwidths to one of first and second output points;
   a first double-channel selection filter having an input port connected to the first output point of the 2-way switch and an output port connected to the second output point of the 2-way switch, for passing frequency bandwidths of adjacent first and second channels;
   a first 3-way switch for switching the output of the first double-channel selection filter to one of first, second and third output points of the first 3-way switch;
   a second double-channel selection filter having an input port connected to the first output point of the first 3-way switch and an output port connected to the second output point of the first 3-way switch, for passing frequency bandwidths of adjacent second and third channels, the output port of the second double-channel selection filter being a first output node of the switching filter module;
   a third double-channel selection filter for receiving the input signal and passing frequency bandwidths of adjacent third and fourth channels;
   a second 3-way switch for switching the output of the third double-channel selection filter to one of first, second and third output points of the second 3-way switch, the first output point of the second 3-way switch being connected to the input port of the second double-channel selection filter; and
   a fourth double-channel selection filter having an input port connected to the second output point of the second 3-way switch and an output port connected to the third output point of the second 3-way switch, the output port of the fourth double-channel selection filter being a second output node of the switching filter module.

2. The switching filter module of claim 1, wherein each of the first, second and third double-channel selection filters passes the frequency bandwidths of two adjacent channels, from the start frequency of the lower channel of the two adjacent channels to the end frequency of the upper channel of the two adjacent channels.

3. The switching filter module of claim 2, wherein each of the first, second and third double-channel selection filters has a filter pass bandwidth of 40 MHz and an effective pass bandwidth of 36.6 MHz for a wireless channel of WLAN (Wireless Local Area Network).

4. The switching filter module of claim 1, wherein the fourth double-channel selection filter passes the bandwidths of the first and fourth channels.

5. A switching filter module for dynamic selection of N channels, comprising:
   N double-channel selection filters, each for passing the frequency bandwidths of two of successive first to Nth channels having predetermined frequency bandwidths; and
   one or more 2-way and 3-way switches, for connecting the double-channel selection filters to one another,
   wherein each of the N double-channel selection filters is serially connected to at least one of the other double-channel selection filters and at least one 3-way switch.

6. The switching filter module of claim 5, wherein each of the double-channel selection filters passes frequency bandwidths of two adjacent channels, from the start frequency of the lower channel of the two adjacent channels to the end frequency of the upper channel of the two adjacent channels.

7. The switching filter module of claim 5, wherein N is a multiple of 4.

8. The switching filter module of claim 5, if N is 4, comprising:
   a 2-way switch for switching an input signal containing at least one of first to eighth adjacent channels having predetermined frequency bandwidths to one of first and second output points;
   a first double-channel selection filter having an input port connected to the first output point of the 2-way switch and an output port connected to the second output point of the 2-way switch, for passing frequency bandwidths of adjacent first and second channels;
   a first 3-way switch for switching the output of the first double-channel selection filter to one of first, second and third output points of the first 3-way switch;
   a second double-channel selection filter having an input port connected to the first output point of the first 3-way switch and an output port connected to the second output point of the first 3-way switch, for passing frequency bandwidths of adjacent second and third channels, the output port of the second double-channel selection filter being a first output node of the switching filter module;
   a third double-channel selection filter for receiving the input signal and passing frequency bandwidths of adjacent third and fourth channels;
   a second 3-way switch for switching the output of the third double-channel selection filter to one of first, second and third output points of the second 3-way switch, the first output point of the second 3-way switch being connected to the input port of the second double-channel selection filter; and
a fourth double-channel selection filter having an input port connected to the second output point of the second 3-way switch and an output port connected to the third output point of the second 3-way switch, the output port of the fourth double-channel selection filter being a second output node of the switching filter module.

9. The switching filter module of claim 8, wherein each of the first, second and third double-channel selection filters passes the frequency bandwidths of two adjacent channels, from the start frequency of the lower channel of the two adjacent channels to the end frequency of the upper channel of the two adjacent channels.

10. The switching filter module of claim 9, wherein each of the first, second and third double-channel selection filters has a filter pass bandwidth of 40 MHz and an effective pass bandwidth of 36.6 MHz for a wireless channel of WLAN (Wireless Local Area Network).

11. The switching filter module of claim 8, wherein the fourth double-channel selection filter passes the bandwidths of the first and fourth channels.

12. The switching filter module of claim 5, if N is 8, comprising:
a first 2-way switch for switching the input signal containing at least one of first to fourth channels having predetermined frequency bandwidths to one of first and second output points;
a first double-channel selection filter having an input port connected to the first output point of the first 2-way switch and an output port connected to the second output point of the first 2-way switch, for passing frequency bandwidths of adjacent first and second channels;
a first 3-way switch for switching the output of the first double-channel selection filter to one of first, second and third output points of the first 3-way switch;
a second double-channel selection filter having an input port connected to the first output point of the first 3-way switch and an output port connected to the second output point of the first 3-way switch, for passing frequency bandwidths of adjacent second and third channels, the output port of the second double-channel selection filter being a first output node of the switching filter module;
a third double-channel selection filter for receiving the input signal and passing frequency bandwidths of adjacent third and fourth channels;
a second 3-way switch for switching the output of the third double-channel selection filter to one of first, second and third output points of the second 3-way switch, the first output point of the second 3-way switch being connected to the input port of the second double-channel selection filter;
a fourth double-channel selection filter having an input port connected to the second output point of the second 3-way switch and an output port connected to the third output point of the second 3-way switch, for passing the frequency bandwidths of the first and fourth channels, the output port of the fourth double-channel selection filter being a second output node of the switching filter module;
a second 2-way switch for switching the input signal containing at least one of fifth to eighth channels to one of first and second output points, the fifth to eight channels being adjacent to the first to fourth channels and having predetermined frequency bandwidths;
a fifth double-channel selection filter having an input port connected to the first output point of the second 2-way switch and an output port connected to the second output point of the second 2-way switch, for passing frequency bandwidths of adjacent fifth and sixth channels;
a third 3-way switch for switching the output of the fifth double-channel selection filter to one of first, second and third output points of the third 3-way switch;
a sixth double-channel selection filter having an input port connected to the first output point of the third 3-way switch and an output port connected to the second output point of the third 3-way switch, for passing frequency bandwidths of adjacent sixth and seventh channels, the output port of the sixth double-channel selection filter being a third output node of the switching filter module;
a seventh double-channel selection filter for receiving the input signal and passing the frequency bandwidths of the adjacent seventh and eighth channels;
a fourth 3-way switch for switching the output of the seventh double-channel selection filter to one of first, second and third output points of the fourth 3-way switch, the first output point of the fourth 3-way switch being connected to the input port of the sixth double-channel selection filter; and
an eighth double-channel selection filter having an input port connected to the second output point of the fourth 3-way switch and an output port connected to the third output point of the fourth 3-way switch, for passing the frequency bandwidths of the fifth and eighth channels, the output port of the eighth double-channel selection filter being a fourth output node of the switching filter module.

* * * * *